United States Patent [19]
Stevenson

[11] 3,943,300
[45] Mar. 9, 1976

[54] TELEPHONE USERS APPARATUS

[75] Inventor: Robert Andrew Stevenson, Newton Aycliffe, England

[73] Assignee: The General Electric Company Limited, London, England

[22] Filed: May 23, 1974

[21] Appl. No.: 472,705

[30] Foreign Application Priority Data
May 23, 1973 United Kingdom............... 24528/73

[52] U.S. Cl.............................. 179/90 B; 179/2 DP
[51] Int. Cl.²......................................... H04M 1/45
[58] Field of Search.......... 179/90 B, 90 BB, 90 BD, 179/90 CS, 2 DP

[56] References Cited
UNITED STATES PATENTS

| | | | |
|---|---|---|---|
| 3,601,552 | 8/1971 | Barnaby et al. | 179/90 B |
| 3,617,638 | 11/1971 | Jochimsen | 179/90 B |
| 3,647,973 | 3/1972 | James et al. | 179/2 DP |
| 3,668,330 | 6/1972 | Hemdal | 179/90 B |
| 3,670,111 | 6/1972 | Bukosky et al. | 179/90 BD |
| 3,735,050 | 5/1973 | Mardas | 179/90 B |
| 3,812,296 | 5/1974 | Paraskevakos | 179/90 B |

*Primary Examiner*—William C. Cooper
*Assistant Examiner*—Gerald L. Brigance
*Attorney, Agent, or Firm*—Kirschstein, Kirschstein, Ottinger & Frank

[57] ABSTRACT

A repertory dialler has a main digital data store for the storage of information required for impulsing to line upon operation of a selected call push-button. This store is a circulating dynamic store. The dialler may be operated either in a recording mode or in an impulsing mode as determined by the position of a manually-operable switch.

In the recording mode, the identity of a call push-button that has been operated is first written in digital form into a circulating buffer store. This is followed by the decimal digits of the exchange and/or directory number of a subscriber which are entered by means of a digit keypad. When all the required digits have been so stored, the data temporarily stored by the buffer store is transferred to the main store and in the main store is added to the end of the block of data circulating therein.

When the dialler is used in the impulsing mode, operation of a selected call push-button causes the appropriate dialling information to be written into the buffer store from which it is rapidly transferred, one decimal digit at a time, to the line impulsing circuit which itself has data storage provision. Operation of the digit keypad at this time enables one or more additional decimal digits (for example in respect of the number of an extension party) to be impulsed to line. These digits are temporarily stored by the buffer store prior to transfer to the impulsing circuit.

8 Claims, 6 Drawing Figures

Figure 2:
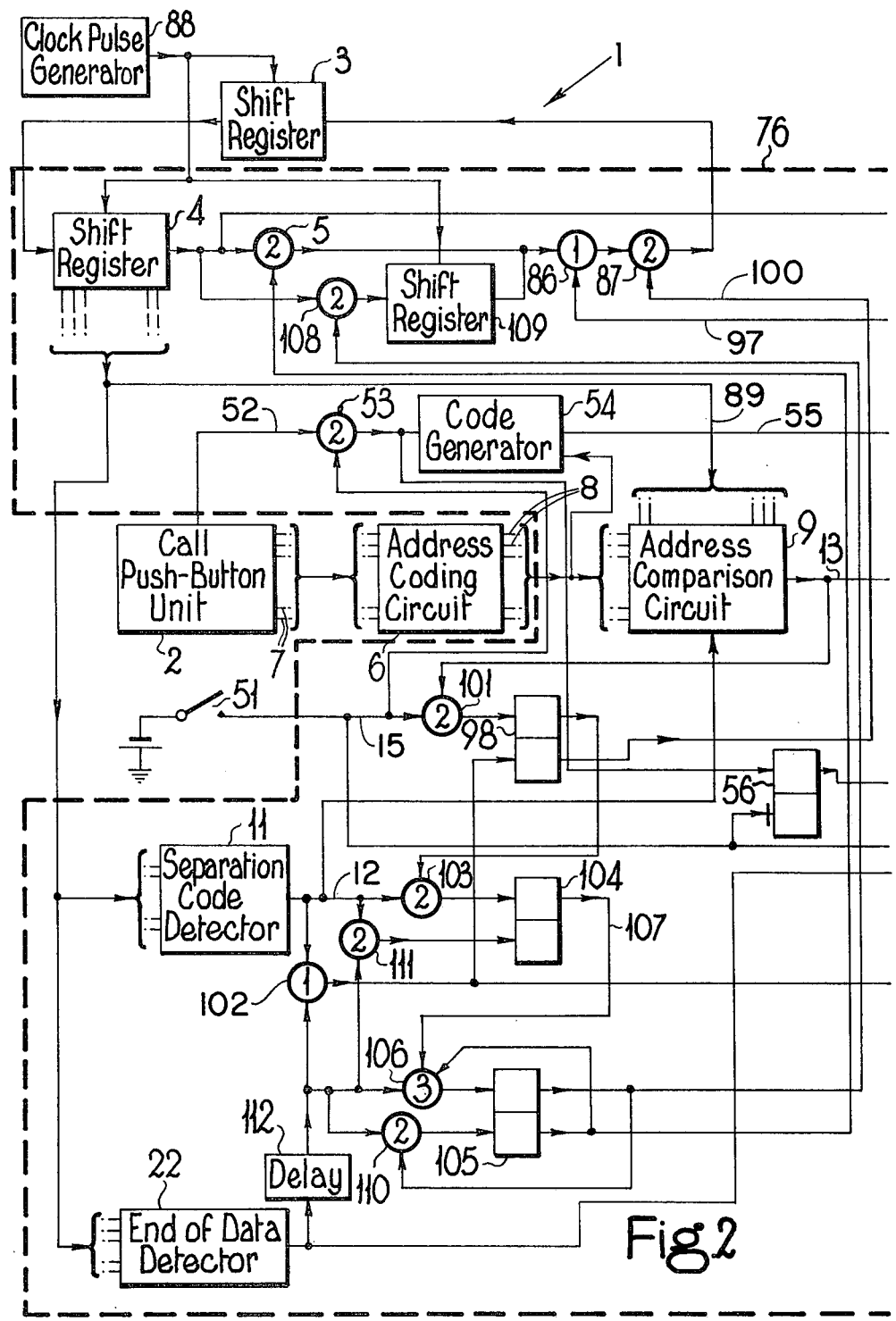
Figure 3:
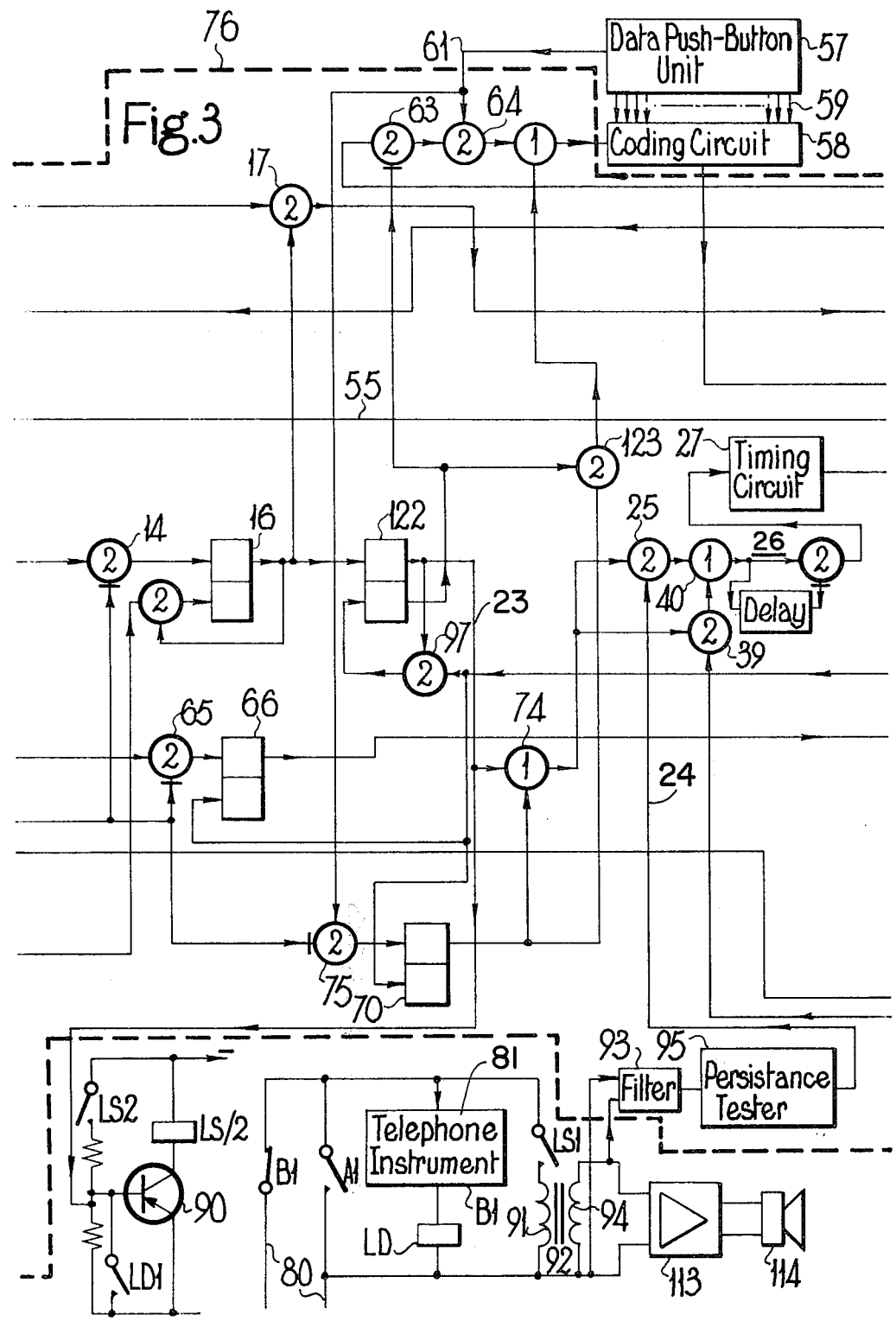
Figure 4:
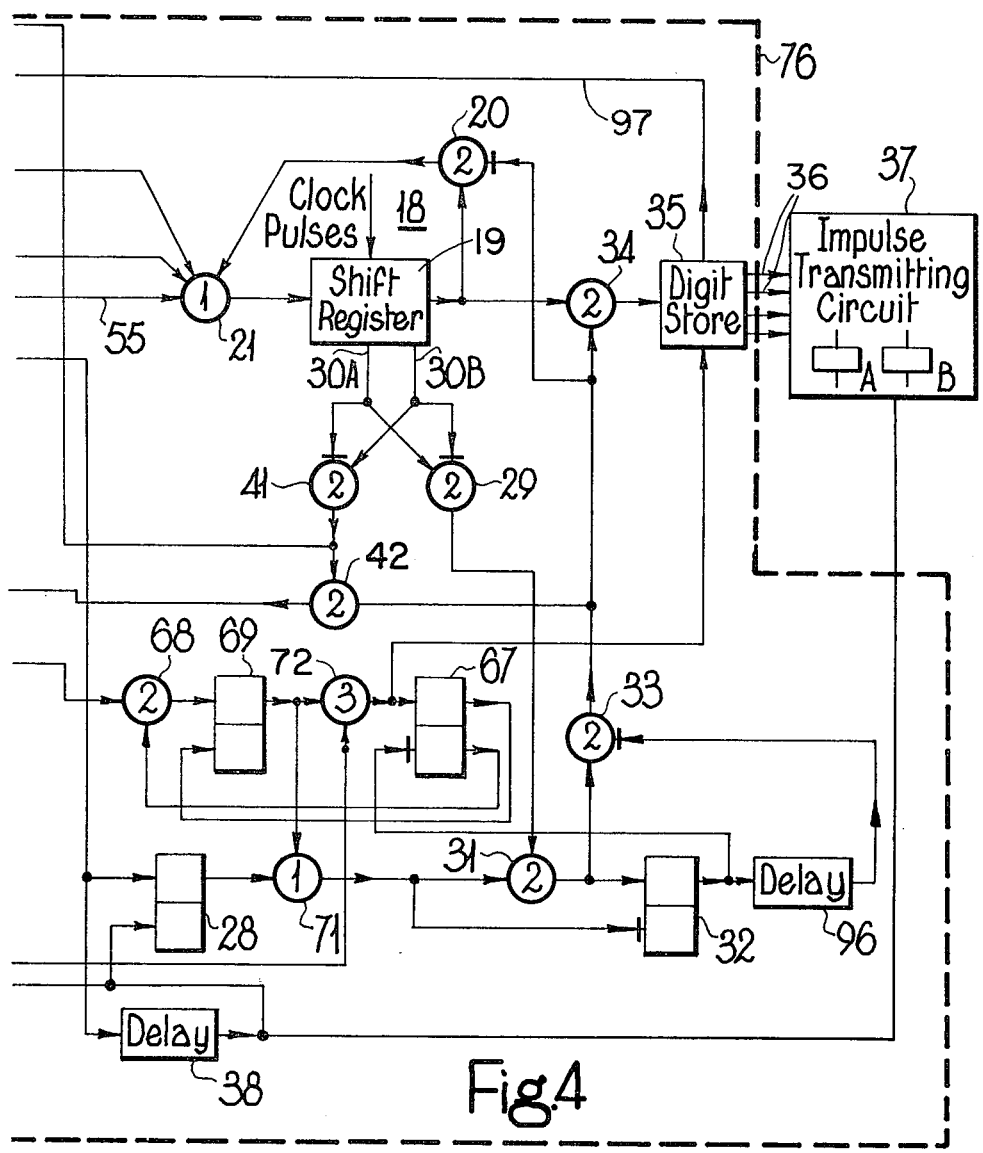

Fig.2 | Fig.3 | Fig.4  Fig.5

TELEPHONE USERS APPARATUS

This invention relates to telephone user's apparatus.

More particularly the invention is concerned with telephone users' apparatus of the kind which is adapted to store information to be dialled out or otherwise signalled to line to characterise any one of a plurality of different subscribers or other parties to whom connection may be required and which has a plurality of manually-operable pushbuttons, keys or other switches which are selectively operable to cause the information stored in respect of different subscribers or parties to be signalled. One example of such apparatus is a so-called "repertory dialler" (by which term it is subsequently referred to herein) which enables a plurality of trains of pulses (simulating those provided by a conventional telephone dial unit) to be transmitted characterising the exchange and/or directory number of a subscriber or party to whom connection is required merely by operating a single pushbutton, key or other switch that is associated with that subscriber or party.

One object of the present invention is to provide apparatus of the kind specified which, in addition to signalling stored information also enables additional information, for example the number of a wanted extension, to be signalled.

According to the present invention, apparatus which is of the kind specified and which is adapted for use selectively in either a recording mode or a line signalling mode has manually-operable means, for example a pushbutton unit, which is arranged when the apparatus is used in the recording mode to enable data that is to be associated with a selected one or combination of said pushbuttons, keys or other switches that has or have been operated to be written into a main data store and a signalling circuit is arranged in response to the data stored in the main data store when the apparatus is being used in its signalling mode to supply electric signals for transmission to line that are characteristic of a subscriber or other party to whom connection is required upon operation of the appropriate one or combination of said pushbuttons, keys or other switches, the apparatus being arranged so that, when in its signalling mode, the signalling circuit will supply for transmission to line electric signals which represent further data, for example an extension number, fed in by the manually-operable means and which are supplied after the signals resulting from operation of one or a combination of said pushbuttons, keys or other switches as aforesaid.

According to a feature of the present invention, apparatus which is of the kind specified and which is adapted for use selectively in either a recording mode or a line signalling mode has a buffer data store which is arranged, when the apparatus is used in its recording mode, temporarily to store digital data characterising a selected one or combination of said pushbuttons, keys or other switches that has or have been operated and digital data supplied by manually-operable means (for example a pushbutton unit) to characterise the signalling information to be associated with the selected one or combination of said pushbuttons, keys or other switches, the digital data temporarily stored by the buffer store being transferred to a main data store when that data is complete in the buffer store, and operation of a selected one or combination of said pushbuttons, keys or other switches when the apparatus is being used in its signalling mode is arranged to cause the signalling information stored in the main data store that is associated with that selection to be temporarily written into said buffer data store while a signalling circuit responds to the data then stored in the buffer store to generate the required signals for transmission to line, the arrangement being such that operation of said manually-operable means to supply further data (for example in respect of an extension number) after operation of one or a combination of said pushbuttons, keys or other switches when the apparatus is being used in its signalling mode results in said further data being temporarily stored by said buffer store and the signalling circuit subsequently supplying signals for transmission to line to characterise this further data after the signals resulting from operation of the one or combination of said pushbuttons, keys or other switches have been supplied as aforesaid.

The signalling circuit may itself include a digital data store to which the date stored by the buffer store is transferred at a higher speed than it can be used by that circuit for supplying the required signals for transmission to line. The buffer store may be a circulating store and in this case, it is preferably arranged for each item of data (for example one decimal digit of the wanted exchange and/or directory number) to be erased from the buffer store as it is transferred from that store so as to assist in identifying the next data item in the buffer store to be transferred. Preferably the main data store is also a circulating store. If both the buffer and main stores are circulating stores, there may be an auxiliary store to which each item of data in the buffer store is transferred in turn, at least when the appparatus is being used in the recording mode, before the data in the main store is correctly disposed for a data item to be transferred from the auxiliary store to the main store.

Figure 1:
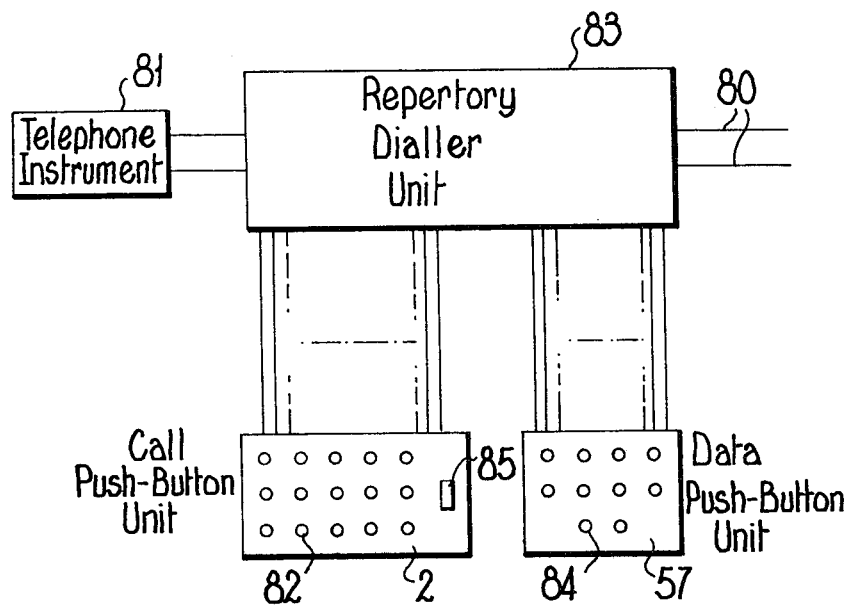

One example of a repertory dialler in accordance with the invention will now be described with reference to the accompanying drawings in which:

FIG. 1 shows the complete repertory dialler in diagrammatic form, and

Figure 6:
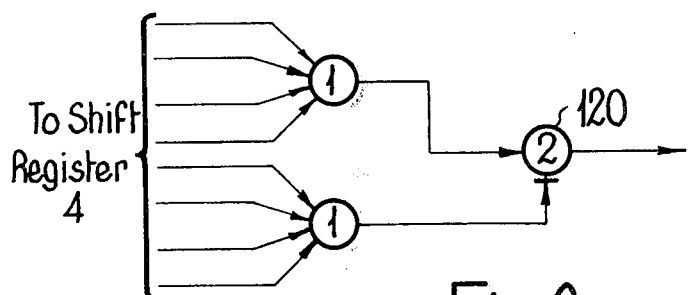

FIGS. 2 to 4, when arranged as set out in FIG. 5, show the circuit of the repertory dialler in more detail, and FIG. 6 shows the circuit of an item of the dialler.

Referring first to FIG. 1, the repertory dialler is arranged to enable a speech connection to be set up over line wires 80 (connected to a public telephone system) between a telephone instrument 81 and any one of a predetermined plurality of other subscribers connected to the telephone system merely by pressing the appropriate pushbutton 82 of a unit 2. The necessary 'dialling' information for each of these subscribers (i.e. the exchange and/or directory number) is stored by electronic equipment, shown in this figure as the unit 83, and that unit is arranged to supply to the line wires 80 the appropriate trains of impulses or other signals characterising the subscriber to be called when a pushbutton 82 is pressed.

There is also a provision for writing new dialling information into the unit 83 in respect of any particular one of the pushbuttons 82 by means of a unit 57 (which may form part of the telephone instrument 81) having ten pushbuttons 84 which are numbered with the ten decimal digits respectively. To effect such writing, a manually-operable key-switch 85 on the unit 2 is operated prior to the appropriate pushbutton 82 being pressed and successive operation of a plurality of the pushbuttons 84 to identify the exchange and/or directory number of the subscriber in question results in that information being stored when the key-switch 85 is returned to its normal position.

Considering now the circuitry of the repertory dialler in more detail with particular reference to FIGS. 2 to 4, a data store 1 is arranged to store the information to be 'dialled out' in binary form. The data store 1 comprises a multi-digit shift register 3 and a feedback path which is connected between the output and input sides of the register 3 and which contains a much smaller shift register 4 and gates 5, 86 and 87. Under normal conditions, enabling signals are supplied to gates 5 and 87 over leads 99 and 100 respectively while a generator 88 feeds clock pulses to the shift registers 3 and 4 so that they operate synchronously. It follows therefore that, during use, any data entered into the store 1 continues to circulate.

The data stored by the store 1 consists of a plurality of groups of binary digits each of which groups is associated with one of the pushbuttons 82 (FIG. 1) an is subsequently referred to herein as a 'word'. Each stored word consists of a plurality of sub-words each of four binary digits. The first sub-word of each word is a characteristic combination of binary digits which are chosen so as not to occur in any other sub-word and which is subsequently referred to as the 'separation code'. The next two sub-words constitute a unique address of that word and the remaining sub-words represent the information to be dialled out when the appropriate push-button 82 of the unit 2 is pressed. In fact, each of the latter sub-words represents one decimal of the subscriber's exchange code or directory number in binary code form.

The data word stored by the store 1 at any time immediately follow one another as they pass round the loop formed by the register 3 and said feedback path. Thus the data words constitute a circulating block of data in which there are no binary digit gaps between adjacent words.

DIALLING OUT

When the repertory dialler is used to set up a call, the appropriate pushbutton 82 of the call unit 2 is pressed as aforesaid. This causes signals to be applied to an address coding circuit 6 over a group of leads 7 so as to identify the pushbutton that had been pressed. (In one arrangement, the leads 7 are arranged in two subgroups and each pushbutton of the unit 2 is arranged when pressed to connect together a unique combination of one lead in each of the two sub-groups. In this case, the address coding circuit 6 operates at high speed to supply signals sequentially to the leads of the first group and to scan the leads of the second group. Thus the lead of the second group over which a signal is received back and the time of occurrence of that signal characterise a pushbutton that has been pressed.) The coding circuit 6 is arranged to supply signals in parallel to a group of leads in binary coded form the pushbutton of the unit 2 that has been pressed. The signals supplied by the coding circuit 6 are passed to an address comparison circuit 9 to which are also passed signals in respect to the data circulating in the store 1.

The shift register 4 is provided so that the binary data in the store 1 may be monitored as it is circulating. In particular signals characterising eight adjacent digits passing through the register 4 are supplied in parallel by the register 4 to the comparison circuit 9 over a group of eight leads which are represented in the drawings by a line 89. Furthermore a code detector 11 is arranged to inspect the circulating data in similar manner and to supply a signal over lead 12 wherever the separation code is passing through the register 4. This signal is also passed to the comparison circuit 9 to initiate operation thereof. When that circuit recognises the address supplied by the coding circuit 6 in the data circulating in the store 1 immediately following a separation code, a signal is supplied over a lead 13. This signal is passed through a gate 14, there being no signal at this time on the lead 15, and is utilized to set a bistable circuit 16.

The pulse signal supplied by the shift register 4 and representing the data circulating in the store 1 is passed to a coincidence gate 17. When the bistable circuit 16 is set, an enabling signal is passed to the gate 17 to permit the data signal supplied to that gate to be passed to a buffer binary data store 18 which is also a circulating store. The store 18 in fact comprises a multi-digit shift register 19 and a feedback path including gates 20 and 21 connected between the output and input sides of the register 19. At the end of the data word being read from the store 1, the bistable circuit 16 is reset either by the next signal supplied by the separation code detector 11 or, if the word in question is at the end of the circulating data block, by a signal supplied by a detector 22 which is arranged to inspect the data passing through the shift register 4 and to supply a signal at the end of the data block. The shift register 19 is arranged to operate synchronously with the shift registers 3 and 4, clock pulses being supplied to the register 19 for this purpose by the generator 88 and the arrangement is such that the appropriate data word circulating in the store 1 less its separation code and address code is caused to circulate in the store 18.

It will be appreciated that this operation of writing data into the store 18, which incidentally is of much smaller capacity than the store 1, does not affect the data circulating in the store 1.

Setting the bistable circuit 16 as aforesaid causes another bistable circuit 122 to be set. This in turn results in a signal being supplied over a lead 23 to cause a transistor 90 to conduct and thereby operate a relay LS. Closure of contacts LS1 loop the line wires 80 by way of normally closed relay contacts B1 and the primary winding 91 of a transformer 92. A signal is thus sent in known manner to the remote exchange that a calling condition exists.

A dial tone filter 93 is connected across the secondary winding 94 of the transformer 92. Upon receipt of dial tone from the exchange, a signal is passed by the filter 93 and, when that tone is received for at least a predetermined period as determined by a persistance circuit 95, a signal is supplied over a lead 24.

Coincidence of the signal on the lead 24 and the bistable circuit 122 being set is detected by a gate 25 so that a signal is passed via a gate 40 to a pulse forming circuit 26. The pulse supplied by the circuit 26 is fed to a timing circuit 27 which effectively introduces a delay of approximately 500 milliseconds. (The timing circuit 27 may conveniently be a digital counting circuit responsive to clock pulses supplied by the generator 88, the supply of such pulses being interrupted when a count is registered corresponding to the period to be timed.) The signal supplied by the timing circuit 27 is utilised to set a bistable circuit 28 to signify that a sub-word is ready to be transferred from the buffer store 18. The sub-word in question is in fact the first one of the block of data then circulating in the store 18 and it is accordingly necessary to wait until that data is appropriately located in the store 18.

Signals are respectively supplied over leads 30A and 30B when there is any data in the last two sub-word locations of the register 19. These two leads are connected to a gate 29 which is arranged to supply a signal as the first digit of the data block in the store 18 emerges from the shift register 19. Coincidence of this signal and the fact that the bistable circuit 28 is set is detected by a gate 31 and the resulting signal is used to set another bistable circuit 32. A gate 33 supplies a pulse at this time, this pulse having a timing and duration such that it coincides with the four binary digits of the sub-word to be transferred from the store 18 as that sub-word appears at the output of the shift register 19. (The duration of the signal supplied by the gate 33 is determined by a delay element 96 which passes an inhibiting signal to the gate 33 a predetermined time after the circuit 32 has been set.) The pulse signal supplied by the gate 33 is in fact passed to a gate 34 to enable a word in question to be read into an auxiliary store 35 and as an inhibiting signal to the gate 20 to erase that word from the store 18. (The store 35 may conveniently comprise four bistable circuits which are arranged to store the four digits of the sub-word respectively).

The store 35 is arranged to supply signals representing the four digits of the stored sub-word in parallel over leads 36 to an impulse transmitting circuit 37. The signal supplied by the timing circuit 27 as aforesaid is utilised, after a short delay introduced by the delay element 38, as a strobe signal to cause the circuit 37 to respond to the signal supplied thereto over the leads 36. This strobe signal is also used to reset the bistable circuit 28 (which in turn, causes the bistable circuit 32 to reset) and is fed back to the pulse forming circuit 26 by way of the gate 39 (which has a signal supplied to its other input at this time by the circuit 22) and gate 40 so as to repeat the above sequence for transferring the next data sub-word then stored in the store 18 to the circuit 37. This sequence is in fact repeated until the buffer store 18 is empty.

A gate 41 is connected to the leads 30A and 30B and is arranged to supply a signal when the end of the circulating data block in the store 18 is detected. If this condition is detected while a transfer pulse is being supplied by the gate 33, it follows that there is no more data in the store 18 to be transferred. Accordingly a signal is then supplied by a gate 42 via a gate 97 to reset the bistable circuit 122. This in turn removes the enabling signal from the gate 39 so that the transfer operation is terminated.

The impulse transmitting circuit 37 is arranged to store the sub-words (each representing one decimal digit of the information to be dialled out) that are transferred thereto from the store 18 by way of the store 35. For each of these decimal digits, the circuit 37 first operates relay A so as to close contacts A1 and then generates a conventional train of dialling impulses by operation of relay B to open contacts B1. Successive trains of impulses are supplied to the line wires 80 with appropriate interdigit pauses. The circuit 37 may be substantially as described in U.S. Pat. No. 3,601,552.

When the called subscriber or party answers, the returned speech signal is passed through the transformer 92 and an amplifier 113 to a loudspeaker 114. The caller then lifts the handset (not shown) of the conventional telephone instrument 81 thereby completing an operating circuit for relay LD. Closure of contacts LD1 cause the transistor 90 to revert to its non-conducting state and thereby release relay LS. This breaks the line hold circuit through the contacts LS1 so that the call may subsequently be released in the normal manner when the handset of the instrument 81 is returned to its cradle.

Instead of generating trains of impulses, the circuit 37 may alternatively be arranged to signal each decimal digit as a pair of audio frequency tones the frequencies of which characterise the decimal digit value.

RECORDING

When it is required to write into the store 1 data associated with a pushbutton 82 of the call unit 2 that had not previously had an associated word in the store, the record key 85 (FIG.1) is moved to its off normal position as aforesaid. Such operation of the record key causes contacts 51 to close. The appropriate pushbutton of the unit 2 is then pressed but the dialling out operation described above is not initiated since an inhibiting signal is now supplied to the gate 14 over the lead 15 as a result of the contacts 51 being closed. Such operation of any pushbutton of the unit 2 causes a signal to be supplied over a lead 52 and accordingly a signal is then passed by a gate 53 to a code generator 54.

The code generator 54 is arranged to supply over a lead 55 a signal carrying in serial form first the separation code (which is generated by the generator 54) and the address code of the appropriate pushbutton as supplied by the address coding circuit 6. (Apart from generation of the separation code, the generator 54 merely converts the pushbutton address from parallel to serial form.) This signal is passed to the gate 21 of the buffer store 18 (which is otherwise empty at this time) so that the separation code and the push-button address code are then caused to circulate as a block in the store 18.

The signal supplied by the gate 53 also causes another bistable circuit 56 to be set.

If now the operation described in the last three paragraphs had been as a result of pressing a call push-button 82 of the unit 2 that had previously had an associated word stored in the store 1, it is necessary for that word to be erased. As will now be described, this is done automatically and the resulting gap (if any) in the circulating data block closed up before the new word is added to the end of that block.

A bistable circuit 98 is normally in the state to supply a signal to the gate 87 over lead 100. A gate 101 however supplies a signal to trigger the circuit 98 to its off-normal state when the contacts 51 are closed (signifying that the repertory dialler is operating in its recording mode) and a signal is supplied by the address comparison circuit 9 (signifying that there is a word already in the store 1 having the address associated with the call push-button 82 of the unit 2 that has been pressed). The signal on the lead 100 is thus removed just as the word in question is due to be passed to the gate 87 with the result that the word is erased from the store 1. At the end of that word, the bistable circuit 98 is reset via a gate 102 by a signal supplied either by the separation code detector 11 (if the erased word was within the data block) or by the end of data detector 22 (if the erased word was at the end of the data block). In either case, the circulating data other than the erased word is unaffected.

If the bistable circuit 98 is restored to its normal condition by a signal supplied by the separation code detector 11. The existence of that signal while the circuit 98 is still off-normal causes a signal to be passed by a coincidence gate 103 to trigger another bistable circuit 104 to a state which signifies that there is a gap in the data block circulating in the store 1 that requires to be closed up.

Under normal operating conditions, an enabling signal is supplied to the gate 5 in the store 1 by a further bistable circuit 105. When the end of the data block circulating in the store 1 reaches the shift register 4, a signal is supplied by the detector 22 and coincidence of this signal with the signal supplied over lead 107 when the bistable circuit 104 is off-normal is determined by a gate 106 which supplies a signal to trigger the bistable circuit 105 to its off-normal state. This has the effect of removing the enabling signal from the gate 5 and supplying a signal to a coincidence gate 108. Thus the circulating data in the store 1 instead of passing through the gate 5 as hitherto now pass through the gate 108 and another shift register 109. The shift register 109 is arranged to operate synchronously with the registers 3 and 4 but only has a capacity of four binary digits. It will be appreciated therefore that at this time the length of the circulation loop of the store 1 is increased by four binary digits.

When the gap in the data block reaches the shift register 4, a signal is again supplied by the end of data detector 22 (which cannot, of course, distinguish between the true end of the block and the end of data preceding the gap) and the occurrence of this signal when the bistable circuit 105 is off-normal is determined by a coincidence gate 110 which then supplies a signal to reset the circuit 105. This returns the store 1 to its non-extended length and occurs at a time such that the first four digit spaces of the gap are in the register 109 so that, as far as the circulating data is concerned, the gap is closed up by that amount.

The sequence described in the last two paragraphs is repeated on successive passes of the data block through the feedback path of the store 1 until the gap in the data block is completely closed up. When there is only a four digit gap left, a coincidence gate 111 detects the simultaneous occurrence of a signal supplied by the separation code detector 11 and a signal (suitably delayed by a delay element 112) supplied by the end of data detector 22. Upon this occurring, the gate 111 supplies a signal to reset the bistable circuit 104 so that the enabling signal supplied thereby to the gate 106 is then removed.

A coding circuit 58 is connected to the pushbutton unit 57 (FIG. 1) by way of leads 59, the circuit 58 deriving a four digit binary representation that is characteristic of any pushbutton 84 of the unit 57 that is pressed. Furthermore, upon any pushbutton 82 of the unit 57 being pressed a signal is supplied over a lead 61.

It is required that the binary representation of any pushbutton of the unit 57 that is pressed after operation of the record key 85 shall be added to the end of the block of data circulating in the buffer store 18. As previously mentioned, the gate 41 supplies a signal when the end of data is detected in the shift register 19. This signal is passed through gates 63 and 64, the latter gate having an enabling signal supplied thereto at this time over lead 61, to the coding circuit 58 which is then arranged to supply a signal to the gate 21 of the buffer store 18, this signal consisting of the binary coded representation of the push-button of the unit 57 that has been pressed in serial form. (Clock pulses supplied by the generator 88 may be passed to the coding circuit 58 to ensure correct timing of the signal supplied thereby.) In other words the sub-word representing the pressed pushbutton 84 is added to the data circulating in the buffer store 18.

The sequence of operations described in the last paragraph is repeated as the succession of push-buttons 84 of the unit 57 are pressed and, when all the required information is stored by the buffer store 18, the record key 85 is returned to its normal position so as to open the contacts 51.

Upon the record key 85 being released, the repertory dialler operates to transfer the data stored by the buffer store 18 to the main store 1 one sub-word at a time. To this end, each sub-word stored by the store 18, starting with the first, is first transferred to the digit store 35 and then added to the end of the data block circulating in the store 1. The manner in which this is achieved will now be described.

Upon the contacts 51 opening, an enabling signal is supplied to a gate 65 to which a signal is already being supplied as a result of a bistable circuit 56 having been set as aforesaid. The signal passed by the gate 65 is utilised to set another bistable circuit 66 to signify that the data in the buffer store 18 is to be transferred to the main store 1. At the same the bistable 56 is reset.

At this time a bistable circuit 67 is in its reset state so that upon the circuit 66 being set a signal is passed through a gate 68 to set another bistable circuit 69. This in turn causes a signal to be passed through a gate 71 to the gate 31. Thus when a signal is supplied by the gate 29 at the beginning of the data block circulating in the buffer store 18, the gate 31 supplies a signal to set the bistable circuit 32 with the result that the first sub-word stored in the store 18 is transferred to the auxiliary store 35 as aforesaid. When now the detector 22 supplies a signal signifying that the end of the data block circulating in the main store 1 is passing out of the shift register 4, the coincidence of this signal and the signal supplied as a result of the bistable circuit 69 having been set, is detected by a coincidence gate 72 which supplies a signal to the store 35 so as to cause a signal representing the sub-word stored thereby in serial form to be supplied over a lead 97 to the gate 86 in the feedback path of the store 1. In this way the sub-word stored by the store 35 is added to the end of the data block circulating in the main store 1.

The signal supplied by the gate 72 is also utilised to set the bistable circuit 67 which in turn resets the circuits 69 and 32.

It will be appreciated that while the bistable circuit 32 was set, the inhibiting signal supplied thereby to the gate 33 via the delay element 96 prevented end of data signal supplied by the detector 29 from causing the transfer of further sub-words from the buffer store 18 to the auxiliary store 35. However, upon the bistable 32 being reset, the bistable circuit 67 is reset so as again to supply an enabling signal to the gate 68 with the result that the bistable circuit 69 is again set. This initiates a sequence for the next subword stored in the buffer store 18 to be transferred to the main store 1 and this is continued until the store 18 is empty. When the last sub-word is about to be transferred from the store 18, a signal is supplied by the gate 42 as aforesaid and this signal is utilised to reset the bistable circuit 66 thereby preventing further transfer action.

SUFFIXING

When the repertory dialler under consideration is being used for dialling out in the manner previously described, the pushbutton unit 57 may be used for suffixing, that is to say signalling one or more decimal numbers to characterise a wanted extension. This is done merely by first pressing the appropriate pushbutton of the unit 2 in the normal way for the wanted subscriber and then the appropriate pushbutton or pushbuttons of the unit 57 to identify the required extension. The record key is in its normal position at this time so that the contacts 51 are open.

If, in the circumstances just envisaged, a pushbutton of the unit 57 is pressed while there is still data circulating in the buffer store 18, the subword corresponding to that pushbutton is immediately written into the store 18 on the end of the circulating block of data and is in due course passed out to the impulse transmitting circuit 37 in the manner previously described. If however the store 18 is empty when a pushbutton of the unit 57 is pressed, it will be appreciated that the bistable circuit 122 will have been reset at that time so that an inhibiting signal is then supplied to the gate 63 so that operation of the coding circuit 58 cannot be initiated as previously described. The signal supplied over the lead 61 when a pushbutton of the unit 57 is pressed is however passed through a gate 75 (which at that time has no inhibiting signal thereto since the contacts 51 are open) to set a bistable circuit 70. A gate 123 is arranged to supply a signal upon the bistable circuit 70 being set when the bistable circuit 122 is in its reset state and this signal is fed to the coding circuit 58 so as to cause that circuit then to supply to the buffer store 18 a signal characterising the pushbutton of the unit 57 that has been pressed. The sub-word in respect of this pushbutton is thus written into the store 18. Setting the bistable circuit 70 also causes a signal to be supplied through the gate 74 to the gate 25 and thereby initiates the sequence of transferring the subword then written into the store 18 to the impulse transmitting circuit 37 via the store 35 in exactly the same manner as previously described. When the buffer store 18 is again empty, a signal is supplied by the gate 42 which in this case serves to reset the bistable circuit 70. Subsequent operation of further pushbuttons of the unit 57 results in additional sub-words being written into the impulse transmitting circuit 37 in the same way.

GENERAL

The shift register 3 is required to store many hundreds of binary digits. In one practical embodiment of the repertory dialler described it has been convenient to replace this single shift register by two commercially available shift registers which are of integrated circuit form and which are connected in tandem so that the circulating digits pass through the two shift registers in turn. That part of the repertory dialler shown in the accompanying drawings within the broken outline 76 may be provided by a single integrated circuit and, in that case, the logic circuitry shown may be replaced by logic circuitry of the kind utilising clocked NOR and NAND gates.

In place of the shift register 4 and gate 5 which constitute the feedback path of the shift register 3, there may be provided two parallel-connected feedback paths each containing a shift register of half the storage capacity of the register 4 and an associated gate, these two feedback paths being arranged to handle alternate binary digits of the circulating data. This arrangement, in combination with a train of impulses having a repetition frequency of half that of the said clock pulses, simplifies the circuitry of the detectors 11 and 22 which are required to inspect successive sub-words (i.e. four binary digits) of the data as it is being circulated in the store 1. The buffer store 18 and the digit store 35 may also be duplicated to handle alternate binary digits with consequential changes particularly to the code generator 54 and the coding circuit 58.

Although the detectors 11 and 22 have been considered as separate items responding to the circulating data (or absence of it), much of their circuitry may be common.

If the separation code is '1111', the separation code detector 11 may merely comprise a four input coincidence gate connected to four adjacent outputs of the shift register 4. The end of data detector 22 may be as shown in FIG. 6, the gate 120 supplying an output signal when any one of the last four storage locations in the register 4 is storing a digit having the value '1' (signifying that a sub-word is stored in those locations) while the preceding four storage locations have no such digit (signifying that no sub-word is stored thereby).

It is to be understood that the present invention is not restricted to repertory diallers in which only a single pushbutton is pressed to determine the information that is to be signalled to line but may also be applied to telephone users' apparatus, for example a short code dialler, in which the information to be signalled is determined by manual operation of two or more selected pushbuttons, keys or other switches.

I claim:
1. Telephone user's apparatus comprising
    a plurality of manually-operable calling means,
    a main data store for the storage of a plurality of data words, each of which comprises digital information in respect of another party to whom telephonic connection may be required,
    mode selection means operable to enable the apparatus to be used in either a recording or transmitting mode,
    a plurality of manually-operable data means,
    circuit means operable subsequent to selection of the recording mode by the mode selection means to write into the main data store a new data word comprising digital information identified by operation of said data means,
    a storage and transmitting circuit to supply electric signals for transmission to line characterising digital information temporarily stored thereby,
    circuit means interconnecting said main data store, said manually-operable calling means and said storage and transmitting circuit to cause the storage and transmitting circuit temporarily to store information read from the main data store in respect of a party identified by operation of the appropriate calling means when the transmitting mode is selected by the mode selection means, and
    further circuit means interconnecting said data means and said storage and transmitting circuit to enable further digital information identified by operation of said data means to be passed to the storage and transmitting circuit subsequent to operation of selected calling means when the appara- tus is being used in the transmitting mode so as to cause the storage and transmitting circuit to supply electric signals for transmission to line characterising the further information after supplying electric signals characterising the digital information read from the main data store in respect of the party identified by operation of the appropriate calling means.

2. Apparatus according to claim 1 wherein the main data store is a circulating store.

3. Apparatus according to claim 1 wherein said data means is a pushbutton unit.

4. Apparatus according to claim 1 wherein said storage and transmitting circuit comprises means to supply to line trains of impulses characterising the digital information stored thereby.

5. Telephone user's apparatus comprising
a plurality of manually-operable calling means,
a main data store for the storage of a plurality of data words each of which comprises digital information in respect of another party to whom telephonic connection may be required,
mode selection means operable to enable the apparatus to be used in either a recording or transmitting mode,
a plurality of manually-operable data means,
a buffer data store,
first circuit means operable subsequent to selection of the recording mode by the mode selection means to write into the buffer store a new data word comprising digital information identified by operation of said data means,
second circuit means operable upon completion of writing of new data word into the buffer store to transfer that word to the main data store,
a storage and transmitting circuit to supply electric signals for transmission to line characterising digital information temporarily stored thereby,
third circuit means interconnecting said main data store, said manually-operable calling means and said buffer store to cause the buffer store temporarily to store information read from the main data store in respect of a party identified by operation of the appropriate calling means when the transmitting mode is selected by the mode selection means,
fourth circuit means interconnecting said buffer store and said storage and transmitting circuit and operable when the transmitting mode of operation has been selected to transfer information stored by the buffer store to the storage and transmitting circuit, and
fifth circuit means interconnecting said data means and said buffer store to enable further digital information identified by operation of said data means to be stored by the buffer store subsequent to operation of selected calling means when the apparatus is being used in the transmitting mode, such further information that is stored by the buffer store then being transferred by way of the fourth circuit means to the storage and transmitting circuit to cause that circuit to supply electric signals for transmission to line characterising the further information after supplying electric signals characterising the digital information read from the main data store in respect of the party identified by operation of the appropriate calling means.

6. Apparatus according to claim 5 wherein said buffer store is a circulating store.

7. Apparatus according to claim 6 wherein the main data store is a circulating store and the second circuit means includes an auxiliary store to which each item of data in the buffer store is transferred in turn before the data in the main store is correctly disposed for the item to be transferred to the main store.

8. Telephone user's apparatus comprising
a plurality of manually-operable calling means,
a main data store for the storage of a plurality of data words each of which comprises digital information in respect of another party to whom telephonic connection may be required,
mode selection means operable to enable the apparatus to be used in either a recording or transmitting mode,
a plurality of manually-operable data means,
a buffer data store in which data stored thereby is caused to circulate,
first circuit means operable subsequent to selection of the recording mode by the mode selection means to write into the buffer store a new data word comprising digital information identified by operation of said data means,
second circuit means operable upon completion of writing of new data word into the buffer store to transfer that word to the main data store,
a storage and transmitting circuit to supply electric signals for transmission to line characterizing digital information temporarily stored thereby,
third circuit means interconnecting said main data store, said manually-operable calling means and said buffer store to cause the buffer store temporarily to store information read from the main data store in respect of a party identified by operation of the appropriate calling means when the transmitting mode is selected by the mode selection means,
fourth circuit means interconnecting said buffer store and said storage and transmitting circuit and operable when the transmitting mode of operation has been selected to transfer information stored by the buffer store to the storage and transmitting circuit, and
fifth circuit means interconnecting said data means and said buffer store to enable further digital information identified by operation of said data means to be stored by the buffer store subsequent to operation of selected calling means when the apparatus is being used in the transmitting mode, such further information that is stored by the buffer store then being transferred by way of the fourth circuit means to the storage and transmitting circuit to cause that circuit to supply electric signals for transmission to line characterizing the further information after supplying electric signals characterizing the digital information read from the main data store in respect of the party identified by operation of the appropriate calling means,
said fifth circuit means including circuit means operable if there is information stored in the buffer store at that time to write the further information into the buffer store on the end of the information circulating in that store and circuit means operable if there is no information then stored in the buffer store to write the further information into the buffer store.

* * * * *